Sept. 20, 1927.
F. H. WHITE
1,642,706
COOKING AND SERVING INSTALLATION
Filed April 21, 1926
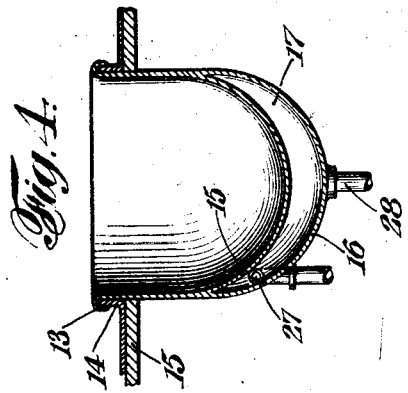
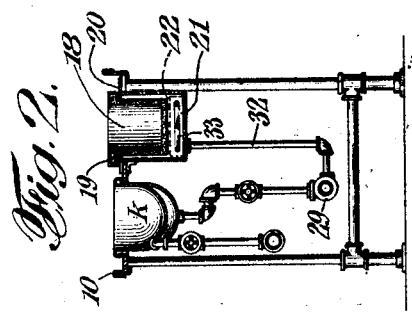
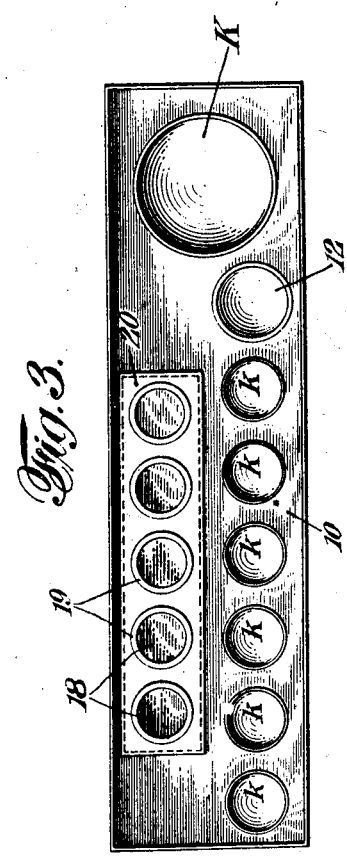
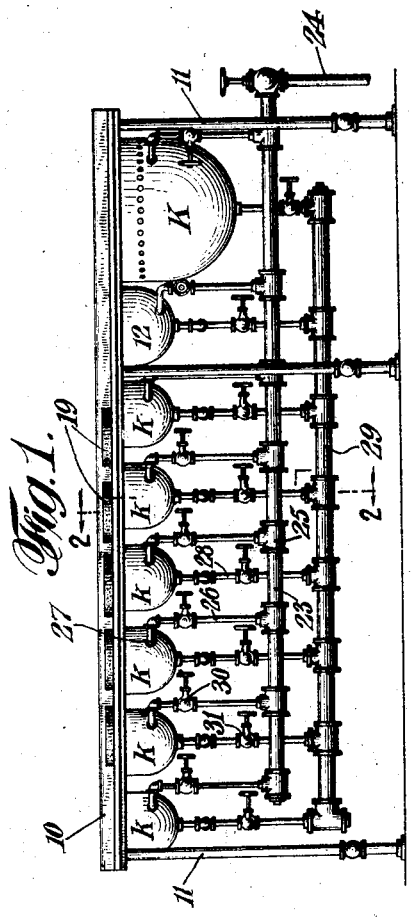
Inventor
Frank H. White
By his Attorneys
Dean, Fairbank, Obrieght & Hirsch.

Patented Sept. 20, 1927.

1,642,706

UNITED STATES PATENT OFFICE.

FRANK H. WHITE, OF NEW YORK, N. Y.

COOKING AND SERVING INSTALLATION.

Application filed April 21, 1926. Serial No. 103,495.

My present invention is primarily concerned with cooking installations for the kitchens of restaurants, hotels, steamships, railroad dining cars, and the like.

Owing to the time consumed in properly cooking food on an open range, it has been the practice in restaurants to employ large pots on the range for cooking substantial quantities of the various ingredients used in making different items on the menu, to mix the ingredients for the different combinations in separate pots, on the range and to keep such mixture ready for service in accordance with demand, in one of a group of crocks that may be heated by exhaust steam. In view of the large mass of the ingredients kept boiling and the difficulty of controlling the temperature on a range, considerable skill and care is required on the part of the cook to avoid excessive evaporation. Moreover, the arrangement noted requires a double installation of a range and of a separate steam heated crock installation, all of which consumes extra space, and necessitates considerable movement on the part of the cook in transferring the food from the stove to the crocks, not to mention the discomfort to the kitchen help due to the heat of the open range.

It is an object of the invention to provide a compact restaurant kitchen installation which has a preferred field of application as a combination sea food cooker and server, in which may be prepared directly from the raw ingredients a considerable variety of different dishes in order to satisfy a variegated bill of fare.

Another object is to provide a cooking and serving installation for a restaurant kitchen by which food can be properly prepared with a minimum of skill or care on the part of the cook and the use of which shall reduce the physical movements that the cook need perform, and shall substantially obviate the discomfort due to the heat of cooking on an open range.

According to my invention, the ingredients of the dishes and the various dishes themselves are cooked and the cooked food is maintained in readiness for service, all by the use of but a single compact installation utilizing steam both as the agency for cooking and for thereafter maintaining the food warm without further cooking.

For this purpose, I employ a set of small double walled kettles mounted preferably in a line on a table, and parallel thereto I provide a series of crocks supported above a compartment of water heated from an exhaust steam pipe. The kettles are heated from a live steam pipe branches of which feed into the steam jackets thereof, each of which jackets has an outlet feeding into an exhaust pipe, from which latter the water for heating the crocks is maintained warm. The piping is all disposed below the table in inobstrusive position, and each of the risers and exhaust branches from the kettles has a valve therein so that the heat to any one kettle can be readily turned on and off as desired.

In the accompanying drawings in which is shown one of various possible embodiments of the several features of the invention, Fig. 1 is a front view of my combination cooker and server, Fig. 2 is a transverse sectional view taken on the line 2—2 of Fig. 1, Fig. 3 is a plan view of the cooker, and;

Fig. 4 is a sectional view on a larger scale illustrating the mounting of the individual kettles.

Referring now to the drawings, I have shown a table 10 permanently installed on the floor of the kitchen by metallic legs 11. In corresponding apertures in the table, I provide a set, in the present embodiment, eight steam jacketed kettles. Six of the kettles marked $k$ are of the same size and arranged in a row, the seventh indicated by numeral 12 is illustratively somewhat larger and the eighth or end kettle, marked $K$ is considerably larger than the others. The kettles are all of identical construction, each having preferably (Fig. 4) a rim 13 beaded over a corresponding upstanding flange 14 on the top 10 of the table. Each of the kettles has a double wall, the two walls 15 and 16 brazed or soldered together to form a jacket 17 at the bottom of the kettle into which the heating or cooking medium is passed.

To the rear of the battery of kettles I provide a plurality of porcelain crocks 18 in this case illustratively five in number in which the previously cooked food may be kept warm preparatory to service. The individual crocks have flanges 19 by which they are supported upon the table and extend downward through corresponding apertures in a frame 20 in the table with their bottoms immediately above a flat pan 21 filled with water and covered preferably by a perforated plate 22.

The live steam for the kettles is admitted through a horizontal pipe 23 supplied from the boiler through a header 24. Connected to the pipe 23 by appropriate T fittings 25 are a plurality of headers 26 one extending up to each of the kettles $k$ and connected by appropriate couplings or unions 27 to feed laterally into the jackets of the kettles. Each of the jackets is drained of its exhaust steam through a drain pipe 28 preferably connected to the very bottom of the kettle by a union (not shown), all of said drain branches emptying into a common horizontal exhaust pipe 29, which may lead through a pipe (not shown) back to the boiler. In order to suitably control the use of each of the kettles, appropriate hand-operated valves 30 are provided, one in each of said live steam headers 26 and preferably also one 31 in each exhaust steam pipe branch 28. Any steam kettle $k$ can thus be brought into service by opening the corresponding inlet and outlet valves 30 and 31 and can similarly be placed out of operation by closing said valves. The crock installation is heated by a pipe 32 fed from the exhaust pipe 29 and leading to a coil 33 preferably disposed within the pan 21 of water.

In the use of the installation for its preferred purpose, that is, as a combination sea food cooker and server, various different sea foods would be cooked in each of the kettles $k$. By way of example, there may be cooked in the consecutive kettles $k$ respectively, lobster, scallops, oysters, clams, shrimp and crab meat. In the largest cooker K there would preferably be heated the cream sauce which forms the base or main ingredient of various fancy sauces employed. To prepare any dish, for instance, lobster Newburgh, an appropriate quantity of the base mass would be ladled from kettle K into kettle 12 to which would be added the various flavoring ingredients to make the Newburgh sauce and then there would be transferred from the kettle $k$ containing it all, or an appropriate proportion of the cooked lobster. The mass would quickly be brought to a boil in the steam kettle 12 and then be transferred therefrom into one of the crocks 18. In the latter, the food is maintained heated though without boiling, and ready for service, individual portions being dished therefrom, as required.

The kettle 12 being readily cleaned, the cook might then prepare another dish by similarly mixing in the kettle 12 appropriate ingredients from other kettles and transferring to the corresponding crock 18. Thus there would be available the various dishes required in the individual crocks 18 from which these are served and as the contents of any crock nears exhaustion, the cook can prepare a fresh supply in the manner noted to replenish said crock.

Special dishes may be prepared with equal convenience outside of rush hours or during rush hours by simply mixing lesser quantities of the ingredients to make an individual portion in the kettle 12 bringing to a boil, and serving directly.

It will be seen that the kettles are maintained in position as fixtures by unions and couplings that connect them to the steam headers 26 and drain pipes 28. Preferably these kettles are made of or plated with Monel metal or equivalent durable material with a purpose of minimizing the wear which ordinarily results in ladling the contents from the kettle or in scraping or scrubbing the kettle.

It will thus be seen that I have provided a kitchen installation for a restaurant, affording substantial convenience in use, in which the raw ingredients for various sea food dishes are readily and conveniently prepared as desired, and readily and conveniently handled for serving, without the heat, discomfort, space consumption and delay incurred in the use of a range.

It will thus be seen that there is herein described apparatus in which the several features of this invention are embodied, and which apparatus in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

Having thus described my invention, what I claim as new and desire to secure by Letters Patent is:

1. A kitchen installation comprising a table having a plurality of steam jacketed kettles fixed therein, a common live steam pipe having branches leading to the respective steam jackets, a valve in each branch to control the admission of steam to the corresponding jacket, an exhaust pipe, return pipes from the various steam jackets, leading to said exhaust and each having a valve therein, a battery of crocks at substantially the level of said kettles and in which food is to be kept warm without boiling, and a steam coil extending below said crocks and supplied from said exhaust pipe.

2. A kitchen installation comprising a table having a row of steam jacketed kettles supported thereon, a steam pipe below said table having a plurality of branches, one leading laterally into the jacket of each of said kettles, a valve in each of said branches, an exhaust pipe, drain pipes from said steam jackets delivering to said exhaust pipe, each of said drain pipes having a valve therein, a compartment on said table extending parallel to said row of steam kettles having a plurality of crocks supported therein in which food may be maintained hot without cooking, and a steam coil below said crocks in said compartment, said steam coil supplied from said exhaust pipe.

Signed at New York, in the county of New York and State of New York, this 20th day of April, A. D. 1926.

FRANK H. WHITE.